United States Patent [19]

Coffia

[11] Patent Number: 4,540,322
[45] Date of Patent: Sep. 10, 1985

[54] SECURITY DEVICE
[75] Inventor: Bob J. Coffia, Oklahoma City, Okla.
[73] Assignee: Grace Petroleum Corporation, Oklahoma City, Okla.
[21] Appl. No.: 457,768
[22] Filed: Jan. 13, 1983
[51] Int. Cl.³ .............................................. F16B 41/00
[52] U.S. Cl. ........................................ 411/338; 411/4;
    411/427; 411/378; 411/389; 411/910
[58] Field of Search ................. 411/427, 389, 4, 432,
    411/910, 378, 396, 397, 548, 338; 70/229, 230,
    231; 292/307 R

[56] References Cited
U.S. PATENT DOCUMENTS

| 1,039,576 | 9/1912 | Mueller | 411/2 X |
|---|---|---|---|
| 1,103,591 | 7/1914 | Kneass | 411/432 |
| 1,516,453 | 11/1924 | Nichols | 70/231 |
| 2,218,126 | 10/1940 | Thacher | 70/231 |
| 3,191,486 | 6/1965 | Gibbens | 411/4 |
| 3,261,254 | 7/1966 | Pinkerton | 411/910 X |
| 3,267,792 | 8/1966 | Yackle | 411/4 |
| 4,037,515 | 7/1977 | Kesselman | 114/245 |
| 4,170,918 | 10/1979 | Burge | 411/910 |
| 4,171,662 | 10/1979 | Simone et al. | 411/910 X |
| 4,302,137 | 11/1981 | Hart | 411/432 |

FOREIGN PATENT DOCUMENTS

| 170803 | 11/1921 | United Kingdom | 411/427 |
|---|---|---|---|
| 2014265 | 8/1979 | United Kingdom | 411/910 |

Primary Examiner—Gary L. Smith
Assistant Examiner—Adrian H. Whitcomb, Jr.
Attorney, Agent, or Firm—Michael J. McGreal

[57] ABSTRACT

The security device consists of a bolt portion and/or a bolt fastener portion which utilize nuts which do not threadedly engage any other part, but give the impression that they do so and that they are the fastening means. These nuts turn freely as if stripped if an unauthorized person attempts to remove them.

36 Claims, 12 Drawing Figures

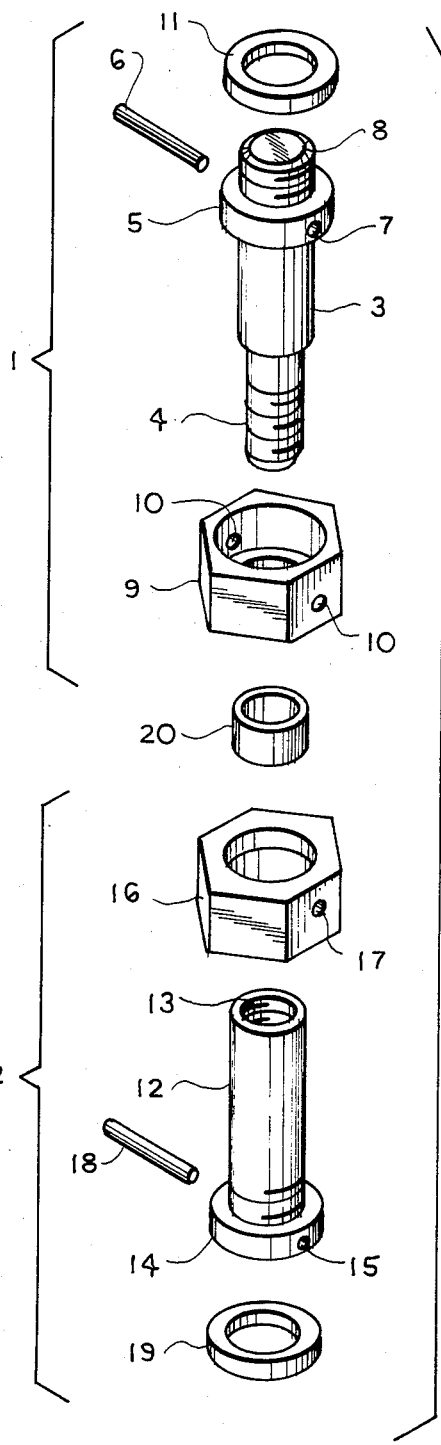
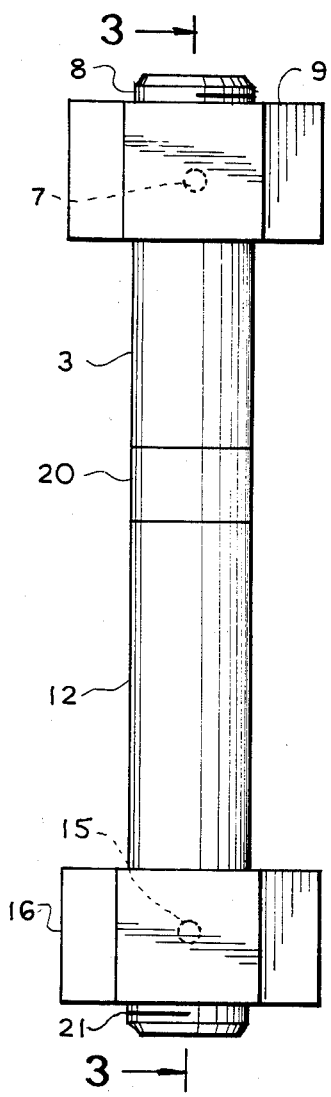
FIG. 1
FIG. 2

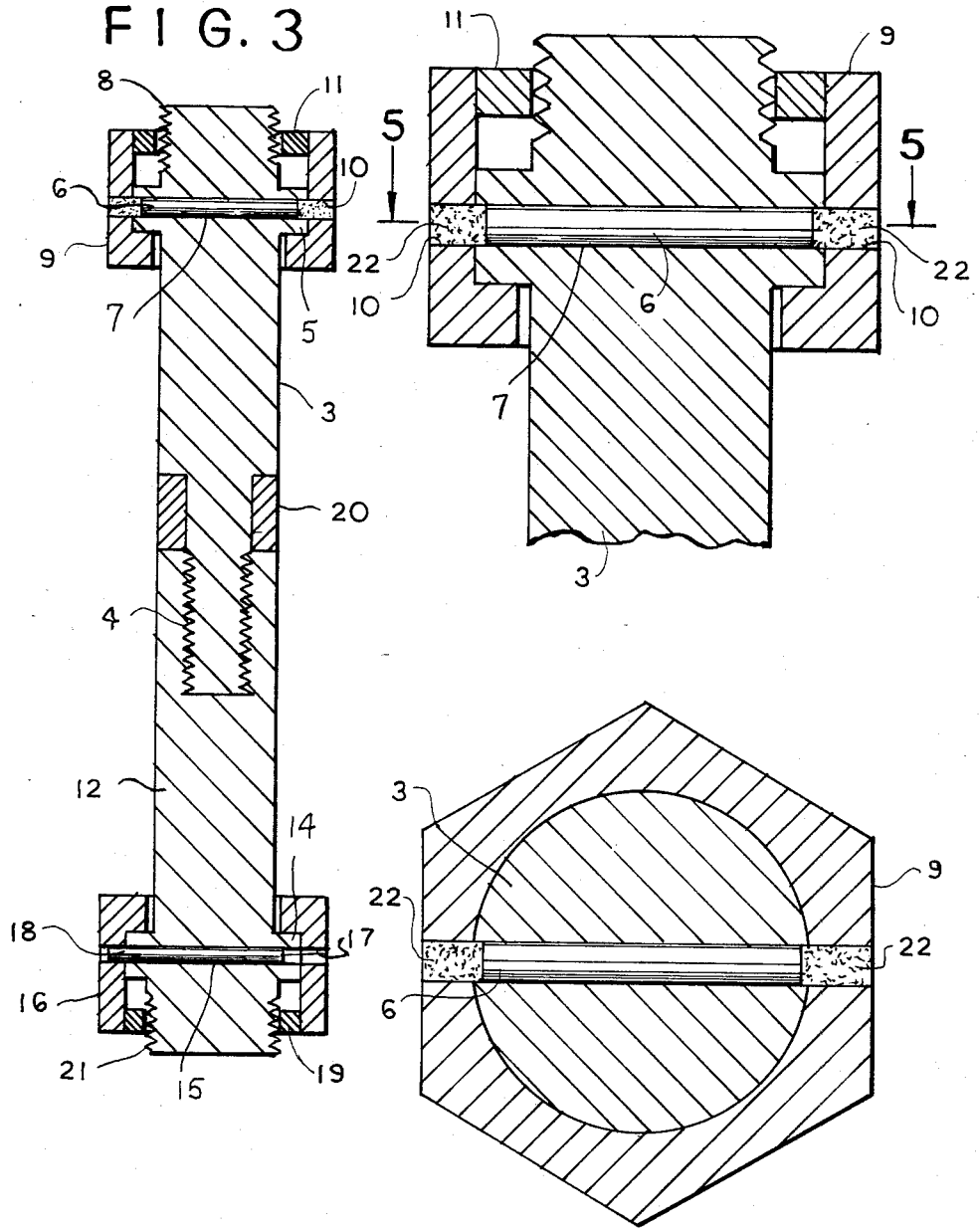

SECURITY DEVICE

This invention relates to a bolt and fastener security device. More particularly, this invention relates to a bolt security device which uses false non-removeable nut fasteners.

A constant problem in many business areas is the theft of unattended equipment. Many times it only takes an hour or so to dismantle and remove a piece of equipment. This is so even though the cost of the particular piece of equipment is several thousand to several hundred thousand dollars. Consequently, there is a continuing need for better products and techniques for securing unattended equipment.

This need for such products is very evident in the oil and gas production business. In this business quite costly equipment is left unattended in remote areas. This includes equipment such as the intricate and costly wellhead valves known as "christmas tree" valves due to the large number of valved exit points. These valves can be detached fairly quickly, are hard to trace, and there exists a resale market. The present security device is very useful in providing greater security for these valves.

No security device is completely foolproof. The intent of any device is to frustrate the person trying to steal an item. This is usually done by requiring special tooling to remove an item. However, those who make a profession of stealing will usually be able to eventually acquire the special tooling. This is then only a short term measure.

The present device for securing valves and other items seeks to maximize this level of frustration. If a person tries to remove a valve or other item secured with this device he will find that the nuts freely turn as if the threads have been stripped. Then if he tries to drill the nut he will find that it is hardened and cannot be drilled. The objective is to provide enough problems so that he will cease his efforts to steal the protected item.

This security device consists of a stem section and a stem receiving section. Each section carries as a fastener a false nut which is a nut which is not threadly engaged to any other part. These false nuts are held in position by a flange and they can freely rotate on this flange. However, the ends of the security device which extend beyond the false nuts are threaded and give the impression that the false nuts are in threaded engagement. The real securing is accomplished by the threaded engagement of the stem section into the stem receiving section. However, this part is concealed within the item which is being secured. These two sections are assembled by locking the false nuts on each end by means of a pin through the false nut and into the flange. The stem section can then be threaded into the stem receiving section. The pins can then be removed or adjusted so that the false nuts turn freely. In place of the pins threaded set screws having unique head designs can be used. That is, the set screws could not be moved without a special tool. The pins and set screws can also be covered over with liquid steel or similar material. In order to remove this security device the liquid steel or similar material is drilled out and the procedure reversed.

The present security device will now be discussed in more detail with reference to the drawings:

FIG. 1, is an exploded view of the security device.

FIG. 2 is a perspective view of the security device assembled in a combined form.

FIG. 3 is a sectional view of the security device of FIG. 2.

FIG. 4 is a sectional view of the false nut shown in FIG. 3.

FIG. 5 is a sectional view of the head portion of the security device showing the pin in its item protecting position.

Figure 6:
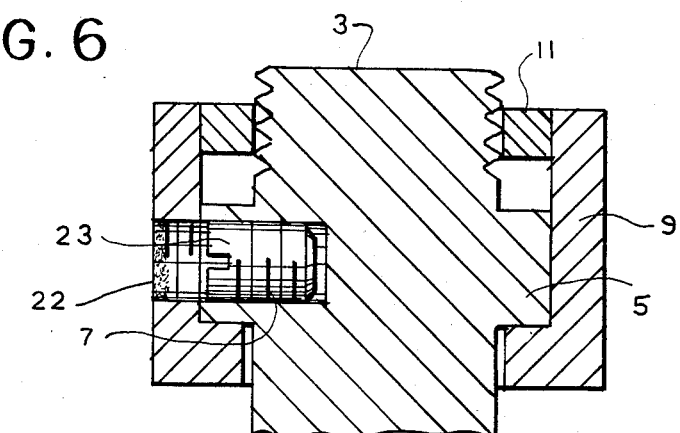
FIG. 6 is a sectional view of the head portion of the security device showing the use of a threaded pin.

FIG. 1 shows the present security device in the combined form where it is the sole means for securing two pieces of an item together. Typically this is used in securing two flanges together. Illustrations of such use are in joining two pieces of pipe or in joining a valve assembly to a pipe. However, these can be used in securing any other items where it is customary to see two bolts as the securing means.

In contrast to the combined form, either the stem assembly 1 or the stem receiving assembly 2 can be used alone. That is, if a door is to be held onto a safe or an item secured onto a floor mount, assembly 1 could be used if as an integral part of the item to be secured there is a threaded piece to receive the threaded stem, or assembly 2 could be used if as an integral part of the item to be secured there is a threaded stud.

In more detail, assembly 1 consists of stem 3 which has a threaded portion 4 at one end and a flange 5 adjacent the other end. Between the flange and the end of the stem there is a threaded area 8. The flange contains a channel 7 which is partially or fully through the flange. This channel is of a size and shape to accept pin 6. This pin and the channel can be of any compatible shape. The remaining part of assembly 1 consists of false nut 9. This nut is not threaded with the lower end having a smaller diameter opening than the upper end. In assembling the stem component, the false nut 9 slides up the stem and the lower narrow diameter part contacts the flange. Spacer 11 is then inserted into the upper part of the false nut, providing a close contact between the nut and threads 8. By revolving the nut on the flange an opening 10 in the false nut can be aligned with channel 7 in the flange. The false nut can have two holes 10 for the embodiment where channel 7 passes through flange 5. The pin can then be inserted into both the false nut and flange. When the pin 6 is in both the nut and flange the whole assembly 1 can be turned as a single unit. However, when the pin is entirely within the flange or is not being used the false nut will freely revolve without revolving the stem 3.

Assembly 2 consists of the female portion of the security device. This consists of threaded stem receiving portion 12 which contains internal threads 13 which are compatible with threads on portion 4. This assembly 2 is similar to that of assembly 1 in that false nut 16 slides over receiving portion 12 and is held in place by flange 14. In this view, the narrow diameter opening of the false nut is part of the upper surface. The flange has channel 15 which can be partially or fully through the flange. One or more openings 17 in the false nut can be aligned with channel 15. When the false nut is in place, spacer ring 19 is inserted. The pin 18 is used to lock the false nut to the flange. When the pin is removed, or fully within the flange the false nut freely turns on the flange. Spacer 20 is an optional item which may be required in some usage.

FIG. 2 shows assembly 1 and assembly 2 assembled into a single unit using spacer 20. In this view threaded portion 8 and threaded portion 21 give the impression that the device consists of a conventional bolt and two conventional nuts. In actual use, sections 3 and 12 and spacer 20 will be within the item being secured. Exposed to view will be false nuts 9 and 16 and the end threaded areas. This is shown in more detail in FIG. 3. This sectional view shows pin 6 within the flange and pin 18 positioned in the flange and in the false nut. In this embodiment the stem 3 rotates in stem receiver 12, when false nut 16 is turned. After the device is fully tightened, the pin 18 is either removed or positioned so that it is entirely within the flange. Both false nuts will then freely turn upon a force being applied.

FIGS. 4 and 5 show the false nut 9 with the pin 6 entirely within the flange and openings 10 in the false nut filled in with a compound 22. This compound can be what is called liquid metal which is a mixture of a metal powder and a thermoset plastic such as an epoxy. The metal powders which are typically used are aluminum or stainless steel. This compound hides the hole in the false nut. This can be further hidden by painting the assembly when it is in place.

Figure 7:
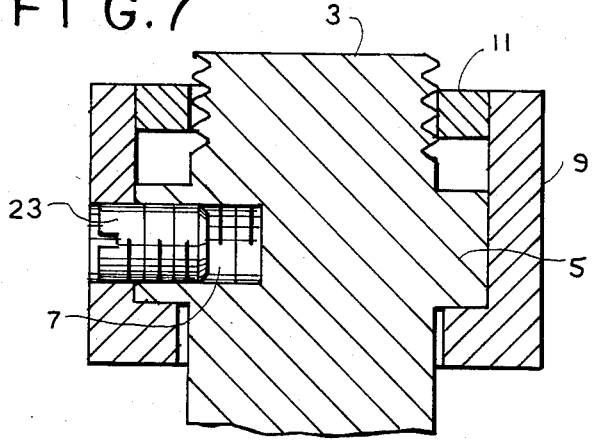
FIG. 7 is a sectional view of the head portion of the security device of FIG. 6 showing the threaded pin in a position where the false nut is locked onto the stem.
Figure 8:
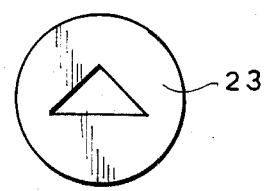
FIGS. 8-11 show different designs which can be used on the head of threaded pins.
Figure 9:
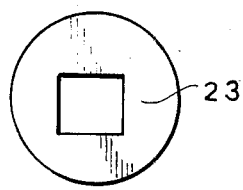

FIG. 6 illustrates the use of a set screw as a pin. In this embodiment the channel 7 is threaded to receive the set screw. When this set screw is within the flange as shown the false nut 9 freely turns on flange 5. However, when backed off as shown in FIG. 7, the false nut and stem portion 3 are locked and will turn as one piece. FIG. 6 also shows the opening in the false nut filled with the compound 22. FIGS. 8 through 11 show different forms which can be used on the face of the set screw in place of the slot which accepts a conventional screwdriver. Not shown, but also useful, is an allen wrench accepting set screw. As can be seen there are numerous shapes which are possible. This is particularly the case, since each shape can be in a recessed or a raised form. These then function as keys with a tool having a shape to fit the particular form on the set screw necessary in order to turn the set screw. This requirement for special tooling creates further problems for a person trying to remove this security device.

Figure 12:
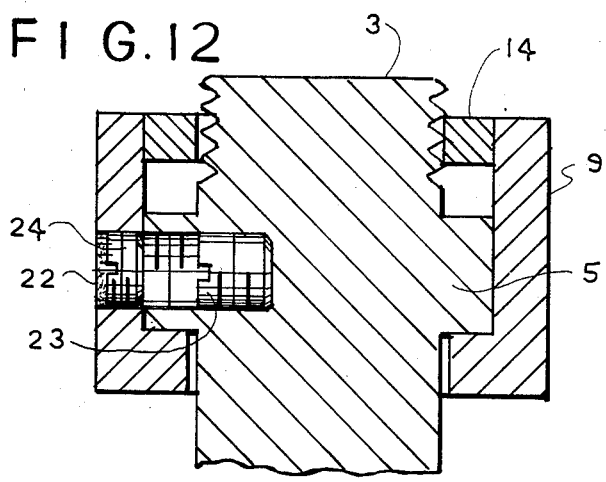
FIG. 12 shows the use of two threaded pins, one in the flange and one in the false nut.
Figure 10:
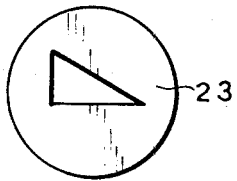
Figure 11:
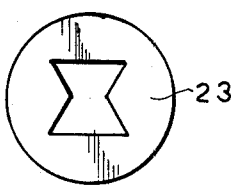

FIG. 12 illustrates a further refinement of the FIG. 6 embodiment. In this embodiment, there is added a second set screw 24 which rides on threads in the false nut. Although this is shown with a conventional slot, any head design can likewise be used on this set screw. Further, the head design need not be the same for each set screw, thus requiring two special tools.

As has been discussed, this security device can be used as a single unit as shown in FIG. 2, or assembly 1 or assembly 2 can be used alone. For instance, in securing vending machines, parking meters, or the like, a base plate which is embedded in the concrete base or otherwise secured to the ground may have projecting threaded studs or it may be threaded to receive a bolt. If this base has a threaded stud, then assembly 2 is used for securing the item to the base, while if the base is threaded to receive a bolt, assembly 1 is used. This provides more versatility for use and significantly decreases inventory requirements. However, a prime use is of the embodiment of FIG. 2 where two flanged items are to be connected.

This security device is susceptible to modifications, but these would be within the scope of this disclosure. For instance, thread locking compositions can be used in the stem and stem receiving parts and also with the set screws. And other minor modifications within the skill of those in the art are possible.

I claim:
1. A security device comprising:
 (a) a stem portion having threads at one end and a flange adjacent the other end;
 (b) a stem receiving portion having a cavity in one end and a flange adjacent the other end, said cavity having threads adapted to receive and engage the threads of said stem portion;
 (c) the flange on said stem portion and on said receptacle portion each having a channel at least partially therethrough;
 (d) a false nut having a cylindrical inner surface and a multi-sided outer surface to resemble a conventional nut, one end of said cylindrical surface having a decreased diameter adapted to contact the flange of said stem portion and thereby be held onto said stem portion;
 (e) a false nut having a cylindrical inner surface and a multi-sided outer surface to resemble a conventional nut, one end adapted to contact the flange of said receiving portion and thereby be held onto said receiving portion;
 (f) an opening in at least one multi-sided outer surface of each false nut, each opening capable of being aligned with the channel in each flange; and
 (g) pin means capable of entering said channel in said flange and the opening in the outer multi-sided surface of said false nut.

2. A security device as in claim 1, wherein on the flange end of the stem portion there are threads between the flange and the end.

3. A security device as in claim 1, wherein in the flange end of the stem receiving portion there are threads between the flange and the end.

4. A security device as in claim 1, wherein the channels in the flange in said stem portion and the flange in said stem receiving portion pass through said flanges.

5. A security device as in claim 4, wherein said false nuts have openings in sides capable of alignment with said channels.

6. A security device as in claim 5, wherein said pin means is partially within said flange and partially within said false nut.

7. A security device as in claim 6, wherein said pin means is entirely within said flange.

8. A security device as in claim 7, wherein the openings in said false nut are filled to the outer surface of said false nut.

9. A security device as in claim 1, wherein the channel in the flange in said stem portion is threaded to receive a threaded pin means.

10. A security device as in claim 9, wherein the channel in the flange in said receiving portion is threaded to receive threaded pin means.

11. A security device as in claim 10, wherein each pin means has a particular form at one end, said form being compatible with a tool for its removal.

12. A security device as in claim 9, wherein the pin means has a particular form at one end, said form being compatible with a tool for its removal.

13. A security device as in claim 9, wherein an opening in a surface of at least one false nut is threaded to receive a threaded pin means.

14. A security device as in claim 13, wherein said threaded pin means has a particular form at one end, said form being compatible with a tool for its removal.

15. A security device comprising:
 (a) a stem portion having threads on one end and a flange adjacent the other end, said flange having a channel at least partially therethrough;
 (b) a false nut having a cylindrical inner surface and a multi-sided outer surface to resemble a conventional nut, one end of said cylindrical inner surface having a decreased diameter region which is less than the outer diameter of the flange of said stem portion said decreased diameter region of said false nut contacting said flange whereby said false nut is thereby maintained on said stem portion but can rotate around said stem portion;
 (c) an opening in at least one side of said multi-sided outer surface, said opening capable of being aligned with the channel in said flange; and
 (d) pin means capable of entering said channel in said flange and said opening in said outer multi-sided surface.

16. A security device as in claim 15, wherein on the flange end of the stem portion there are threads between the flange and the end.

17. A security device as in claim 15, wherein the channel in the flange in said stem portion passes through said flange.

18. A security device as in claim 17, wherein said false nut has openings capable of alignment with said channel.

19. A security device as in claim 18, wherein said pin means is partially within said flange and partially within said false nut.

20. A security device as in claim 19, wherein said pin means is entirely within said flange.

21. A security device as in claim 20, wherein the openings in said false nut are filled to the outer surface of said false nut.

22. A security device as in claim 15, wherein the channel in the flange in said stem portion is threaded to receive a threaded pin means.

23. A security device as in claim 22, wherein the pin means has a particular form at one end, said form being compatible with a tool for its removal.

24. A security device as in claim 22, wherein an opening in a surface of the false nut is threaded to receive a threaded pin means.

25. A security device as in claim 24, wherein said threaded pin means has a particular form at one end, said form being compatible with a tool for its removal.

26. A security device comprising:
 (a) a cylinder having a cavity in one end and a flange on the other end, said cavity having threads adapted to receive the threads of a bolt;
 (b) a false nut having a cylindrical inner surface and a multi-sided outer surface to resemble a conventional nut, one end of said cylindrical surface having a decreased diameter adapted to contact the flange on said cylinder;
 (c) an opening in at least one side of said multi-sided outer surface, said opening capable of being aligned with a channel in said flange; and
 (d) pin means capable of entering said channel in said flange and said opening in said outer multi-sided surface.

27. A security device as in claim 26, wherein on the flange end of the cylinder there are threads between the flange and the end.

28. A security device as in claim 26, wherein the channel in the flange in said cylinder passes through said flange.

29. A security device as in claim 28, wherein said false nuts have openings in sides capable of alignment with said channels.

30. A security device as in claim 29, wherein said pin means is partially within said flange and partially within said false nut.

31. A security device as in claim 30, wherein said pin means is entirely within said flange.

32. A security device as in claim 31, wherein the openings in said false nut are filled to the outer surface of said false nut.

33. A security device as in claim 26, wherein the channel in the flange on said cylinder is threaded to receive a threaded pin means.

34. A security device as in claim 33, wherein the pin means has a particular form at one end, said form being compatible with a tool for its removal.

35. A security device as in claim 33, wherein an opening in a surface of the false nut is threaded to receive a threaded pin means.

36. A security device as in claim 35, wherein said threaded pin means has a particular form at one end, said form being compatible with a tool for its removal.

* * * * *